(12) United States Patent
Zhu (10) Patent No.: US 12,370,701 B2
(45) Date of Patent: Jul. 29, 2025

(54) MULTI-DEGREE-OF-FREEDOM ROBOTIC ARM

(71) Applicant: CHINA INSTITUTE OF ATOMIC ENERGY, Beijing (CN)

(72) Inventor: Xinyan Zhu, Beijing (CN)

(73) Assignee: CHINA INSTITUTE OF ATOMIC ENERGY, Beijing (CN)

( * ) Notice: Subject to any disclaimer, the term of this patent is extended or adjusted under 35 U.S.C. 154(b) by 0 days.

(21) Appl. No.: 18/687,260

(22) PCT Filed: Dec. 29, 2023

(86) PCT No.: PCT/CN2023/143368
§ 371 (c)(1),
(2) Date: Feb. 27, 2024

(87) PCT Pub. No.: WO2024/146472
PCT Pub. Date: Jul. 11, 2024

(65) Prior Publication Data
US 2025/0121513 A1    Apr. 17, 2025

(30) Foreign Application Priority Data
Jan. 3, 2023 (CN) .......................... 202310003135.2

(51) Int. Cl.
*B25J 9/14* (2006.01)
*B25J 13/08* (2006.01)
*B25J 17/02* (2006.01)
*B25J 19/00* (2006.01)

(52) U.S. Cl.
CPC ............. *B25J 17/0283* (2013.01); *B25J 9/14* (2013.01); *B25J 13/088* (2013.01); *B25J 19/0025* (2013.01)

(58) Field of Classification Search
CPC ..... B25J 9/146; B25J 9/14; B25J 9/009; B25J 9/06
See application file for complete search history.

(56) References Cited

U.S. PATENT DOCUMENTS 12,251,824 B2 * 3/2025 Hsu .................... B25J 9/0009

FOREIGN PATENT DOCUMENTS

| CN | 110815282 A | * | 2/2020 | ............. B25J 17/02 |
| CN | 211761552 U | * | 10/2020 | |

* cited by examiner

Primary Examiner — Gregory Robert Weber
(74) Attorney, Agent, or Firm — Kinney & Lange, P.A.

(57) ABSTRACT

A multi-degree-of-freedom robotic arm includes a body mechanism, an actuator mechanism, and a control system. The body mechanism has a first end rotating around a vertical heading axis and a second end rotating around a horizontal first pitch axis. The actuator mechanism is installed at the second end of the body mechanism and includes: a first roll mechanism rotatably installed at the second end around a first roll axis perpendicular to the first pitch axis; a second roll mechanism rotating around a second roll axis and installed with an end actuator; and a pitch mechanism installed at a junction between the first roll mechanism and the second roll mechanism so that the second roll mechanism rotates around a second pitch axis with respect to the first roll mechanism. The control system controls and drives an operation of the body mechanism and the actuator mechanism.

7 Claims, 4 Drawing Sheets

MULTI-DEGREE-OF-FREEDOM ROBOTIC ARM

CROSS REFERENCE TO RELATED APPLICATION(S)

This application is a Section 371 National Stage Application of International Application No. PCT/CN2023/143368 filed on Dec. 29, 2023, which claims priority to Chinese Patent Application No. 202310003135.2 filed on Jan. 3, 2023, the whole disclosures of which are incorporated herein by reference in their entireties.

TECHNICAL FIELD

The present disclosure relates to the field of intelligent manufacturing device technology, and in particular, to a multi-degree-of-freedom robotic arm.

BACKGROUND

With the development of industrialization, intelligent devices are constantly updated, and robotic arms are widely used in artificial intelligence industrial production such as cutting, welding, spraying, etc.

Some robotic arms are motor-driven. Due to a low kinetic energy efficiency of the motor, a large-load multi-degree-of-freedom robotic arm generally has a large size and weight, and an installation and operation of the large-load multi-degree-of-freedom robotic arm may be difficult in a case of a limited operating space. Some robotic arms are hydraulic-driven. Although the hydraulic robotic arm with a small size and weight may achieve a high-power load, it requires high operational skills and experience of the operator in operating conditions that require high engineering flexibility, and the robotic arm has a low operational accuracy and a poor usage effect.

SUMMARY

In view of the existing technical problems, the present disclosure provides a multi-degree-of-freedom robotic arm to at least partially solve the above-mentioned technical problems. By providing a body mechanism and an actuator mechanism, a space occupied by a driving motor is saved, and it is possible to perform a high-load and high-precision operation in a limited narrow space.

According to embodiments of the present disclosure, a multi-degree-of-freedom robotic arm is provided, including: a body mechanism, a first end of the body mechanism is configured to rotate around a vertical heading axis, and a second end of the body mechanism is configured to rotate around a horizontal first pitch axis; an actuator mechanism installed at the second end of the body mechanism, the actuator mechanism includes: a first roll mechanism rotatably installed at the second end of the body mechanism around a first roll axis perpendicular to the first pitch axis; a second roll mechanism configured to rotate around a second roll axis, an end actuator is installed on the second roll mechanism; and a pitch mechanism installed at a junction between the first roll mechanism and the second roll mechanism so that the second roll mechanism rotates around a second pitch axis with respect to the first roll mechanism; and a control system configured to control and drive an operation of the body mechanism and the actuator mechanism.

According to the multi-degree-of-freedom robotic arm provided by the present disclosure, during use, the control system controls the first end of the body mechanism to rotate around the vertical heading axis, controls the second end of the body mechanism to rotate around the first pitch axis, controls the first roll mechanism to rotate around the first roll axis, and controls the second roll mechanism to rotate around the second roll axis. The pitch mechanism enables the first roll mechanism to rotate around the second pitch axis with respect to the second roll mechanism, so that the robotic arm drives the end actuator to achieve the multi-degree-of-freedom rotation, thereby saving the space occupied by the driving motor, reducing the size and weight of the robotic arm while maintaining the same load power and remote control performance, and reducing the complexity of the hydraulic servo control system. In this way, the body mechanism and the actuator mechanism may perform the high-load and high-precision operation in the limited narrow space.

REFERENCE NUMERALS

1. Body mechanism;
   11. Rotary mechanism;
      111. Base; 112. Rotary assembly;
   12. Dual pitch mechanism;
      121. First driving arm; 122. Second driving arm; 123. First pitch joint; 124. Second pitch joint; 125. Driving assembly; 1251. First driving member; 1252. Second driving member;
2. Actuator mechanism;
   21. First roll mechanism;
   22. Second roll mechanism;
   23. Pitch mechanism; 231. Pitch driving member;
   24. Roll driving member;
3. Control system;
   31. Hydraulic oil source; 311. Oil supply mechanism; 3111. Oil tank; 3112. Hydraulic pump; 3113. Check valve; 313. Oil return mechanism; 3131. Back pressure valve; 3132. Adjustable relief valve; 314. Oil pipeline; 315. Oil filter;
   32. Electrical control system;
   33. Electrohydraulic servo valve;
   34. Valve Island;
   35. Stop valve.

DETAILED DESCRIPTION OF EMBODIMENTS

In order to make objectives, technical solutions and advantages of the present disclosure clearer, a further detailed description of the present disclosure will be provided below in conjunction with specific embodiments and with reference to the accompanying drawings.

The descriptions of structure embodiments and methods of the present disclosure are disclosed here. It should be understood that this is not intended to limit the present disclosure to the specific disclosed embodiments. The present disclosure may be implemented by using other features, elements, methods and embodiments. Similar elements in different embodiments are generally denoted by similar numerals.

Robotic arms are widely used in industrial production. Some robotic arms are motor-driven. Due to a low kinetic energy efficiency of a motor, a large-load multi-degree-of-freedom robotic arm generally has a large size and weight, and an operating space is limited. Furthermore, some robotic arms are hydraulic-driven. Although a hydraulic robotic arm with a small size and weight may achieve the high-power load, it requires high operational skills and experience of the operator, and the robotic arm has a low operational accuracy and a poor usage effect. In addition, a hydraulic system that integrates a servo control system and a hydraulic oil source may require high modification and maintaining costs.

Figure 1:
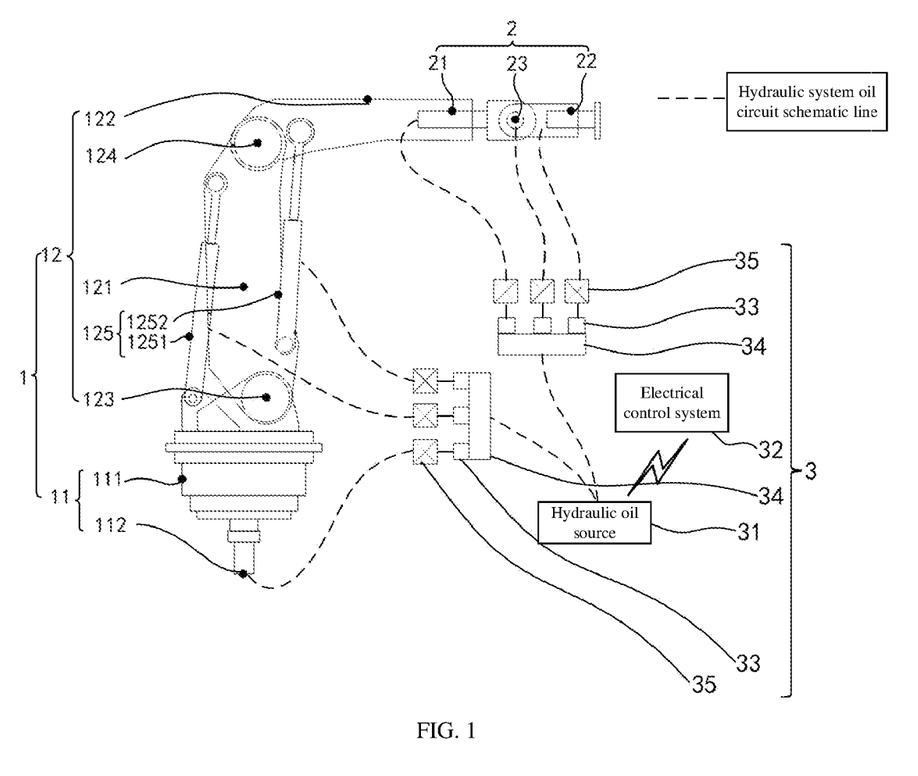
FIG. 1 shows a schematic diagram of a multi-degree-of-freedom robotic arm according to embodiments of the present disclosure.

FIG. 1 shows a schematic diagram of a multi-degree-of-freedom robotic arm according to embodiments of the present disclosure.

Embodiments of the present disclosure propose a multi-degree-of-freedom robotic arm. As shown in FIG. 1, the multi-degree-of-freedom robotic arm includes a body mechanism 1, an actuator mechanism 2, and a control system 3.

The body mechanism 1 has a first end configured to rotate around a vertical heading axis, and a second end configured to rotate around a horizontal first pitch axis.

The actuator mechanism 2 is installed at the second end of the body mechanism 1. The actuator mechanism 2 includes a first roll mechanism 21, a second roll mechanism 22, and a pitch mechanism 23. The first roll mechanism 21 is rotatably installed at the second end of the body mechanism 1 around a first roll axis perpendicular to the first pitch axis. The second roll mechanism 22 is configured to rotate around a second roll axis, and an end actuator is installed on the second roll mechanism 22. The pitch mechanism 23 is installed at a junction between the first roll mechanism 21 and the second roll mechanism 22, so that the second roll mechanism 22 is rotatable around a second pitch axis with respect to the first roll mechanism 21.

The control system 3 is configured to control and drive an operation of the body mechanism 1 and the actuator mechanism 2.

According to the multi-degree-of-freedom robotic arm provided by the present disclosure, an electromagnetic servo valve 33, a valve island 34 and a stop valve 35 of the control system 3 are installed on the body mechanism 1. During use, the control system 3 controls the first end of the body mechanism 1 to rotate around the vertical heading axis, controls the second end of the body mechanism to rotate around the first pitch axis, controls the first roll mechanism 21 to rotate around the first roll axis, and controls the second roll mechanism 22 to rotate around the second roll axis. The pitch mechanism 23 enables the first roll mechanism 21 to rotate around the second pitch axis with respect to the second roll mechanism 22, so that the robotic arm drives the end actuator to achieve a multi-degree-of-freedom rotation, thereby saving a space occupied by a driving motor, reducing the size and weight of the robotic arm while maintaining the same load power and remote control performance, reducing a complexity of a hydraulic servo control system, and allowing a high-load and high-precision operation in a limited narrow space.

Referring to FIG. 1, according to the multi-degree-of-freedom robotic arm in the aforementioned embodiment of the present disclosure, the body mechanism 1 may be used to determine an approximate pose of the end actuator. In a case of the approximate pose, a further pitch pose may be determined through the pitch mechanism 23, and then the first roll mechanism 21 and/or the second roll mechanism 22 may be rotated so that the end actuator may perform operations in a substantially spherical space centered on a center of the pitch mechanism 23 (a rotation angle of the pitch mechanism 23 is less than 360 degrees). For example, when the first roll mechanism 21 rotates, the end actuator may continuously perform operations on an annular operating surface which is centered on the pitch mechanism 23 and with the second roll mechanism 22 as a radius.

In a schematic embodiment, as shown in FIG. 1, the body mechanism 1 includes a rotary mechanism 11 and a dual pitch mechanism 2312.

The rotary mechanism 11 is rotatably installed on an installation foundation around the heading axis. The installation foundation may be an excavator body, a cutting machine body, an industrial production line for spraying or welding, etc. The heading axis is in the vertical direction.

Specifically, as shown in FIG. 1, the rotary mechanism 11 includes a base 111 and a rotary assembly 112. The base 111 is installed on the installation foundation, and the rotary assembly 112 may drive, under the control of the control system 3, the base 111 to rotate around the heading axis on the installation foundation.

As shown in FIG. 1, the dual pitch mechanism 2312 is installed on the rotary mechanism 11. The dual pitch mechanism 2312 includes a first driving arm 121 and a second driving arm 122. A first end of the first driving arm 121 is installed on the base 111 through a first pitch joint 123, and is rotatably installed on the base 111 around the second pitch axis. A first end of the second driving arm 122 is installed at a second end of the first driving arm 121 through a second pitch joint 124, and is rotatably installed at the second end of the first driving arm 121 around a third pitch axis. The second pitch axis and the third pitch axis are both horizontally provided and are perpendicular to the heading axis.

In a schematic embodiment, as shown in FIG. 1, the body mechanism 1 further includes a driving assembly 125, and the driving assembly 125 includes a first driving member 1251 and a second driving member 1252.

The first driving member 1251 is hinged between the base 111 and the first driving arm 121, and is configured to drive, under the control of the control system 3, the first driving arm 121 to rotate around the first pitch joint 123.

The second driving member 1252 is hinged between the first driving arm 121 and the second driving arm 122, and is configured to drive, under the control of the control system 3, the second driving arm 122 to rotate around the second pitch joint 124.

The first driving member 1251 and the second driving member 1252 are linear hydraulic cylinders or linear air cylinders, which is not limited here. In this embodiment, the first driving member 1251 and the second driving member 1252 are linear hydraulic cylinders and drive the first driving arm 121 and the second driving arm 122 to rotate under the control of the control system 3.

According to embodiments of the present disclosure, during use, the control system 3 controls the rotary assembly 112 to drive the base 111 to rotate around the heading axis on the installation foundation. The control system 3 controls an expansion and contraction quantity of pistons of the first driving member 1251 and the second driving member 1252, so that the first driving arm 121 rotates around the first pitch joint 123, and the second driving arm 122 rotates around the second pitch joint 124, thereby achieving a multi-degree-of-freedom rotation of the robotic arm. The first driving member 1251 and the second driving member 1252 are linear hydraulic cylinders, which may meet high loads.

In a schematic embodiment, as shown in FIG. 1, rotation angle measuring instruments, such as angle encoders, are provided at the rotary assembly 112, the first pitch joint 123 and the second pitch joint 124. The rotation angle measuring instrument is configured to obtain a rotation angle, so that the control system 3 controls and drives the operation of the body mechanism 1 and the actuator mechanism 2 in response to the rotation angle measuring instrument. The rotary assembly 112, the first pitch joint 123 and the second pitch joint 124 may rotate under the control and driving of the control system 3. At the same time, the rotation angle measuring instrument obtains rotation angle information and transmits the rotation angle information to the control system 3, so that the control system 3 further regulates the operation of the body mechanism 1 and the actuator mechanism 2 according to the received rotation angle information, and continuously adjusts an operating status of the robotic arm, thereby achieving a high-precision operation.

In a schematic embodiment, as shown in FIG. 1, each of the first roll mechanism 21 and the second roll mechanism 22 includes a roll driving member 24 and a roll angle measuring instrument. The roll driving members 24 are configured to rotate around the first roll axis and the second roll axis respectively under the driving of the control system 3, and the roll driving elements 24 are swinging hydraulic cylinders. The roll angle measuring instrument is an angle encoder, which is installed on the roll driving member 24 and configured to obtain a rotation angle of the roll driving member 24, so that the control system 3 controls and drives the operation of the body mechanism 1 and the actuator mechanism 2 in response to the roll angle measuring instrument.

In a schematic embodiment, as shown in FIG. 1, the pitch mechanism 23 includes a pitch driving member 231 and a pitch angle measuring instrument. The pitch driving member 231 is a swinging hydraulic cylinder, which is installed at a junction between the roll driving member 24 of the first roll mechanism 21 and the roll driving member 24 of the second roll mechanism 22, and is configured to rotate around the second pitch axis under the driving of the control system 3. The pitch angle measuring instrument is an angle encoder, which is installed on the pitch driving member 231 and configured to obtain a rotation angle of the pitch driving member 231, so that the control system 3 controls and drives the operation of the body mechanism 1 and the actuator mechanism 2 in response to the pitch angle measuring instrument.

According to embodiments of the present disclosure, under the control of the control system 3, the roll driving member 24 of the first roll mechanism 21 rotates around the first roll axis, and the roll driving member 24 of the second roll mechanism 22 rotates around the second roll axis. At the same time, the roll angle measuring instruments obtain rotation angle information of the first roll mechanism 21 and the rotation angle information of the second roll mechanism 22, respectively. The pitch driving member 231 rotates around the second pitch axis, thereby driving a second roll driving member 24 to rotate around the second pitch axis with respect to a first roll driving member 24. The pitch angle measuring instrument obtains the rotation angle information of the pitch driving element 231, so that the control system 3 controls and drives the operation of the body mechanism 1 and the actuator mechanism 2 in response to the roll angle measuring instrument and the pitch angle measuring instrument. Then, the control system 3 may further regulate the operation of the body mechanism 1 and the actuator mechanism 2 according to the received rotation angle information, and continuously adjust the operating status of the robotic arm, thereby achieving a high-precision operation.

In a schematic embodiment, as shown in FIG. 1, the control system 3 includes an electrical control system 32 and a hydraulic oil source 31. The hydraulic oil source 31 is configured to provide hydraulic oil under a control of the electrical control system 32 so as to drive the body mechanism 1 and the actuator mechanism 2 to rotate. The hydraulic oil of the hydraulic oil source 31 is in communication with two groups of valve islands 34, and each group of valve islands 34 is provided with three hydraulic oil circuits. The six hydraulic oil circuits are respectively in communication with the rotary assembly 112, the first driving member 1251, the second driving member 1252, the roll driving member 24 of the first roll mechanism 21, the roll driving member 24 of the second roll mechanism 22, and the pitch driving member 231 of the pitch mechanism 23, so as to control the operation of the robotic arm.

Figure 2:
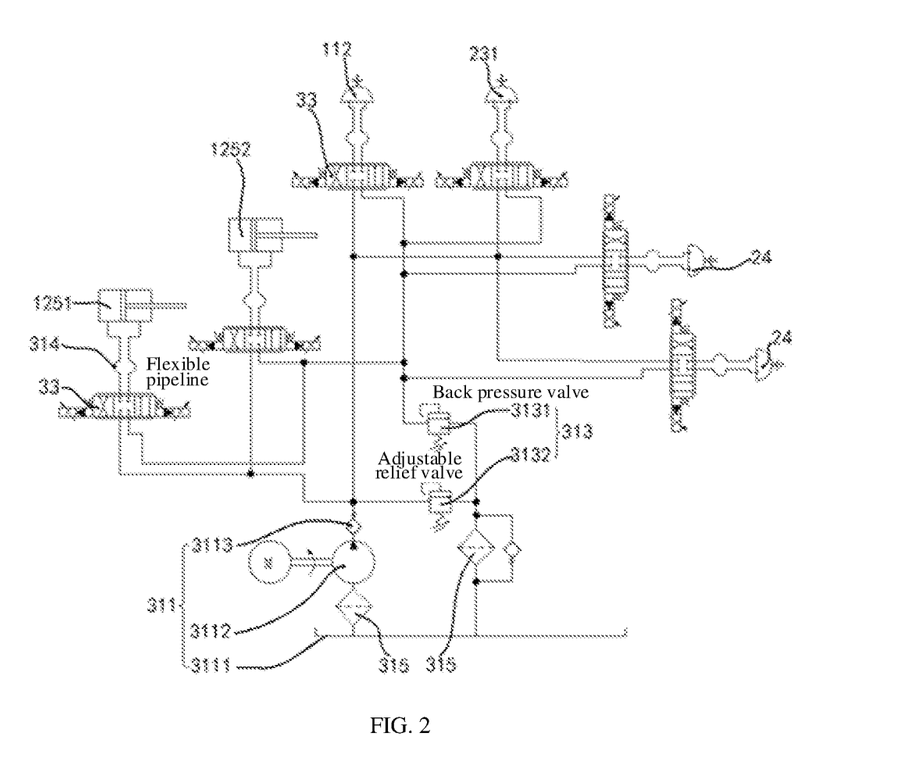
FIG. 2 shows a schematic diagram of a combination of a hydraulic oil source and an electrohydraulic servo valve of a multi-degree-of-freedom robotic arm according to embodiments of the present disclosure.

FIG. 2 shows a schematic diagram of the hydraulic oil source 31 and an electrohydraulic servo valve 33 of the multi-degree-of-freedom robotic arm according to embodiments of the present disclosure (for simplicity, the valve island 34 and the stop valve 35 in FIG. 1 are not shown).

In a schematic embodiment, as shown in FIG. 1 and FIG. 2, the hydraulic oil source 31 includes an oil supply mechanism 311, an electrohydraulic servo valve 33, an oil return mechanism 313, and two oil pipelines 314.

Specifically, as shown in FIG. 1 and FIG. 2, the oil supply mechanism 311 is suitable for supplying hydraulic oil; the electrohydraulic servo valve 33 is configured to be in communication with the oil supply mechanism 311 to receive the hydraulic oil supplied from the oil supply mechanism 311; the oil return mechanism 313 is in communication with the electrohydraulic servo valve 33 and configured to receive the hydraulic oil from the electrohydraulic servo valve 33, and forms a circuit with the oil supply mechanism 311. The two oil pipelines 314 include a first oil pipeline 314 and a second oil pipeline 314. One ends of the first oil pipeline 314 and the second oil pipeline 314 of the hydraulic oil source 31 are respectively in communication with the electrohydraulic servo valve 33; the other ends thereof are respectively in communication with the rotary assembly 112, the first driving member 1251, the second driving member 1252, the roll driving element 24 and the pitch driving member 231, and are configured to operate under the driving of the electrohydraulic servo valve 33 controlling a hydraulic oil quantity.

Specifically, as shown in FIG. 1 and FIG. 2, the electrohydraulic servo valve 33 adjusts the hydraulic oil input to the first end of the first oil pipeline 314 and the first end of the second oil pipeline 314, so as to respectively control the expansion and contraction quantities of the pistons of the linear hydraulic cylinders of the first driving member 1251 and the second driving member 1252 in communication with the second end of the first oil pipeline 314 and the second end of the second oil pipeline 314; and respectively control the swinging hydraulic cylinders of the rotary assembly 112, the pitch driving member 231, the roll assembly of the first roll mechanism 21 and the roll assembly of the second roll mechanism 22 in communication with the second ends of the first oil pipeline 314 and the second oil pipeline 314 to rotate clockwise or counterclockwise at a predetermined angle.

According to embodiments of the present disclosure, the oil supply mechanism 311, the electrohydraulic servo valve 33 and the oil return mechanism 313 form a closed circuit. Under the control of the electrical control system 32, the electrohydraulic servo valve 33 receives the hydraulic oil supplied from the oil supply mechanism 311, and delivers excessive hydraulic oil to the oil supply mechanism 311 through the oil return mechanism 313, so as to meet the hydraulic oil required by the electrohydraulic servo valve 33. Under the control of the electrical control system 32, the electrohydraulic servo valve 33 converts an electromagnetic signal into a mechanical motion of a valve core, controls the opening and closing of the oil circuits of the first oil pipeline 314 and the second oil pipeline 314, adjusts a flow section, and changes an input hydraulic oil flow rate of the body mechanism 1 and the actuator mechanism 2, so as to control the expansion and contraction quantities of the pistons of the linear hydraulic cylinders of the first driving member 1251 and the second driving member 1252 as well as rotation quantities of the swinging hydraulic cylinders of the rotary assembly 112, the pitch driving member 231, the roll assembly of the first roll mechanism 21 and the roll assembly of the second roll mechanism 22, and continuously adjust the operating status of the robotic arm, thereby achieving a high-precision operation.

In a schematic embodiment, as shown in FIG. 2, the oil supply mechanism 311 includes an oil tank 3111, a hydraulic pump 3112, and a check valve 3113. The oil tank 3111 is suitable for storing hydraulic oil; the hydraulic pump 3112 is configured to deliver the hydraulic oil from the oil tank 3111 to the electrohydraulic servo valve 33; and the check valve 3113 is connected between the hydraulic pump 3112 and the electrohydraulic servo valve 33 to prevent the hydraulic oil from flowing back to the oil tank 3111.

In a schematic embodiment, as shown in FIG. 2, the oil return mechanism 313 includes a back pressure valve 3131 and an adjustable relief valve 3132. The back pressure valve 3131 is connected between the electrohydraulic servo valve 33 and the oil tank 3111 so as to control a working pressure of the hydraulic oil flowing back to the oil tank 3111. The adjustable relief valve 3132 is connected between the oil supply mechanism 311 and the oil tank 3111 to control the working pressure of the hydraulic oil flowing back to the oil tank 3111.

According to embodiments of the present disclosure, the hydraulic pump 3112 delivers the hydraulic oil from the oil tank 3111 to the electrohydraulic servo valve 33. The check valve 3113 prevents the hydraulic oil from flowing in an opposite direction during a delivery process, thereby ensuring a stable delivery of the hydraulic oil to the electrohydraulic servo valve 33. Then, the excessive hydraulic oil in the electrohydraulic servo valve 33 flows back to the oil tank 3111. During the flow back process, the hydraulic oil flows through the back pressure valve 3131 to regulate the working pressure of the hydraulic oil. The relief valve further regulates the pressure of the hydraulic oil source 31.

In a schematic embodiment, as shown in FIG. 2, the hydraulic oil source 31 further includes two oil filters 315, which are respectively connected between the hydraulic pump 3112 and the oil tank 3111 and between the oil return mechanism 313 and the oil tank 3111, so as to filter the hydraulic oil and improve a service life of the hydraulic oil source 31.

A plurality of electrohydraulic servo valves 33 are installed on the valve island 34. A plurality of stop valves 35 are in fluid communication with the electrohydraulic servo valve 33 through oil circuits, and the plurality of stop valves 35 are in fluid communication with the body mechanism and the actuator mechanism through oil circuits.

The valve island 34 is in fluid communication with the hydraulic oil source 31 through oil circuits. The plurality of electrohydraulic servo valves 33 may be simply and compactly integrated onto the valve island 34. The valve island 34 includes a base, in which a hole is made for conduction according to requirements of a flow rate and a flow direction of each valve. A sealing ring is provided at a junction between the electrohydraulic servo valve 33 and the hole. There is a particular interval between holes of the valve block. The hole has a simple oil circuit, with an impact resistance and a small fluid flow loss.

Through the stop valve 35 providing using the hydraulic actuator mechanism and the electrohydraulic servo valve 33, which is adjusted to be normally closed, so as to prevent an uncontrolled movement of the robotic arm caused by hydraulic oil flowing toward a pressure balance direction inside the electrohydraulic servo valve 33 after the device is powered off.

According to technical solutions provided by the present disclosure, if the electrohydraulic servo valve 33 and the stop valve 35 malfunction, they may be replaced by replacing the valve island 34 without the need to replace the entire hydraulic system.

According to the present disclosure, the electrohydraulic servo valve 33 is not part of the hydraulic oil source 31, and the control of the actuator assembly may be achieved by modifying the oil circuit, without the need to modify the entire hydraulic system.

Figure 3:
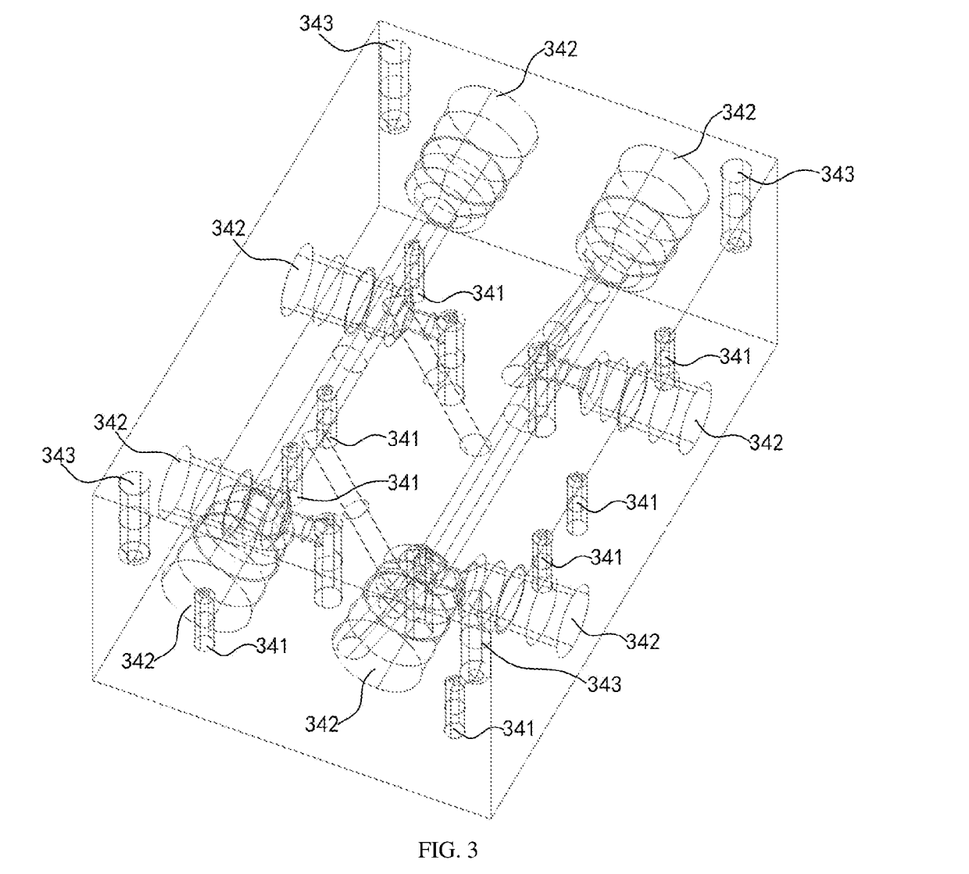
FIG. 3 shows a schematic diagram of a base of a valve island of a multi-degree-of-freedom robotic arm from a perspective according to embodiments of the present disclosure.
Figure 4:
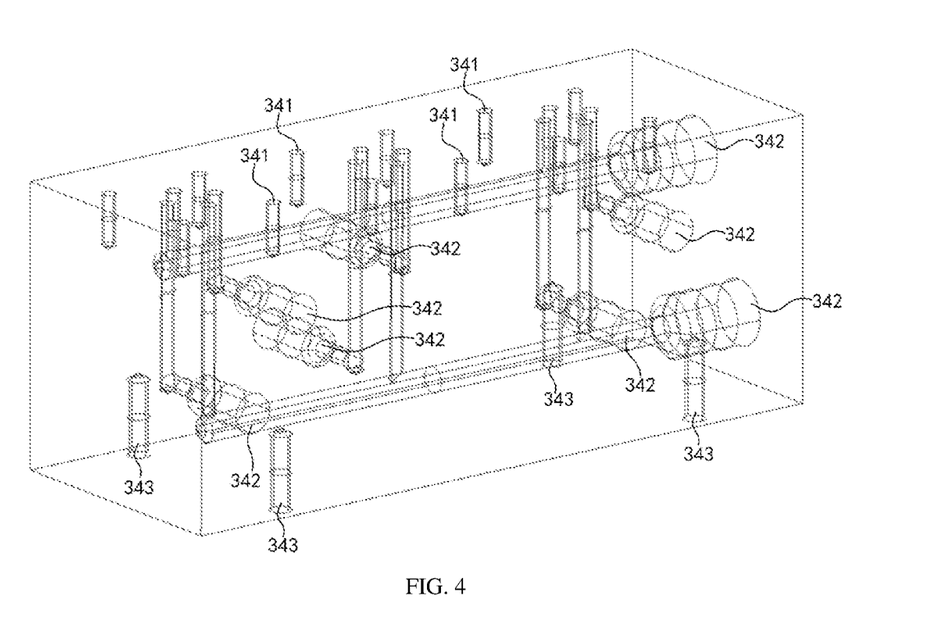
FIG. 4 shows a schematic diagram of the base of the valve island of the multi-degree-of-freedom robotic arm from another perspective according to embodiments of the present disclosure.

FIG. 3 and FIG. 4 respectively show internal structural diagrams of the base of the valve island 34 in some embodiments of the present disclosure from different perspectives. A plurality of fixing holes 341 are formed inside the base of the valve island 34, which may be used to fix the electrohydraulic servo valve 33 on the base of the valve island 34. A plurality of fixing holes 343 are further formed inside the base of the valve island 34, which are used to fix the valve island 34 to the robotic arm. A plurality of oil circuits 342 in communication with the electrohydraulic servo valve are formed inside the base of the valve island 34, so as to facilitate the fluid communication between the two.

According to the multi-degree-of-freedom robotic arm provided by the present disclosure, during use, the control system 3 controls the first end of the body mechanism 1 to rotate around the vertical heading axis, controls the second end of the body mechanism to rotate around the first pitch axis, controls the first roll mechanism 21 to rotate around the first roll axis, and controls the second roll mechanism 22 to rotate around the second roll axis. The pitch mechanism 23 enables the first roll mechanism 21 to rotate around the second pitch axis with respect to the second roll mechanism 22, so that the robotic arm drives the end actuator to achieve the multi-degree-of-freedom rotation, thereby saving the space occupied by the driving motor, reducing the size and weight of the robotic arm while maintaining the same load power and the remote control performance, reducing the complexity of the hydraulic servo control system, and allowing the high-load and high-precision operation in a limited narrow space.

The above specific embodiments further describe the objectives, technical solutions and beneficial effects of the present disclosure. It should be understood that the above are just specific embodiments of the present disclosure and are not intended to limit the present disclosure. Any modifications, equivalent substitutions, improvements, etc. made within the spirit and principles of the present disclosure should be included in the scope of protection of the present disclosure.

What is claimed is:

1. A multi-degree-of-freedom robotic arm, comprising:
a body mechanism, wherein a first end of the body mechanism is configured to rotate around a vertical heading axis, and a second end of the body mechanism is configured to rotate around a horizontal first pitch axis;
an actuator mechanism installed at the second end of the body mechanism, wherein the actuator mechanism comprises:
a first roll mechanism rotatably installed at the second end of the body mechanism around a first roll axis perpendicular to the first pitch axis;
a second roll mechanism configured to rotate around a second roll axis, wherein an end actuator is installed on the second roll mechanism; and
a pitch mechanism installed at a junction between the first roll mechanism and the second roll mechanism so that the second roll mechanism rotates around a second pitch axis with respect to the first roll mechanism; and
a control system configured to control and drive an operation of the body mechanism and the actuator mechanism;
wherein the body mechanism comprises: a rotary mechanism rotatably installed on an installation foundation around the heading axis; and a first driving arm, wherein a first end of the first driving arm is rotatably installed on the rotary mechanism around the first pitch axis;
wherein the body mechanism further comprises a second driving arm, wherein a first end of the second driving arm is rotatably installed at a second end of the first driving arm around a third pitch axis;
wherein the rotary mechanism comprises: a base, wherein the first end of the first driving arm is rotatably installed on the base around the first pitch axis; and a rotary assembly configured to drive, under a control of the control system, the base to rotate around the heading axis on the installation foundation;
wherein the first end of the first driving arm is installed on the base through a first pitch joint, and the second driving arm is installed at the second end of the first driving arm through a second pitch joint; and wherein the body mechanism further comprises a driving assembly configured to drive, under the control of the control system, the first pitch joint and the second pitch joint to rotate;
wherein the driving assembly comprises: a first driving member hinged between the base and the first driving arm, wherein the first driving member is configured to drive, under the control of the control system, the first driving arm to rotate around the first pitch joint; and a second driving member hinged between the first driving arm and the second driving arm, wherein the second driving member is configured to drive, under the control of the control system, the second driving arm to rotate around the second pitch joint;
wherein each of the first roll mechanism and the second roll mechanism comprises: a roll driving member configured to rotate around the first roll axis or the second roll axis under the driving of the control system;
wherein the pitch mechanism comprises: a pitch driving member installed at a junction between the roll driving member of the first roll mechanism and the roll driving member of the second roll mechanism, wherein the pitch driving member is configured to rotate around the second pitch axis under the driving of the control system;
wherein the control system comprises: an electrical control system; and a hydraulic oil source configured to provide hydraulic oil under a control of the electrical control system so as to drive the body mechanism and the actuator mechanism to rotate;
wherein the multi-degree-of-freedom robotic arm further comprises a plurality of stop valves, a valve island and an electrohydraulic servo valve, the electrohydraulic servo valve is provided on the valve island, and the plurality of stop valves are in fluid communication with the electrohydraulic servo valve through oil circuits, and the plurality of stop valves are in fluid communication with the body mechanism and the actuator mechanism through oil circuits; and
wherein the hydraulic oil source comprises: an oil supply mechanism configured to supply hydraulic oil; an oil return mechanism in communication with the electrohydraulic servo valve, wherein the oil return mechanism is configured to receive the hydraulic oil from the electrohydraulic servo valve and forms a circuit with the oil supply mechanism; and two oil pipelines, wherein first ends of the two oil pipelines are in communication with the electrohydraulic servo valve, and second ends of the two oil pipelines are respectively in communication with the rotary assembly, the first driving member, the second driving member, the roll driving member and the pitch driving member, and the two oil pipelines are configured to operate under a driving of the electrohydraulic servo valve controlling a hydraulic oil quantity.

2. The multi-degree-of-freedom robotic arm according to claim 1, wherein each of the first roll mechanism and the second roll mechanism further comprises:
a roll angle measuring instrument installed on the roll driving member, wherein the roll angle measuring instrument is configured to obtain a rotation angle of the roll driving member so that the control system controls and drives the operation of the body mechanism and the actuator mechanism in response to the roll angle measuring instrument.

3. The multi-degree-of-freedom robotic arm according to claim 2, wherein the pitch mechanism further comprises:
a pitch angle measuring instrument installed on the pitch driving member, wherein the pitch angle measuring instrument is configured to obtain a rotation angle of the pitch driving member so that the control system controls and drives the operation of the body mechanism and the actuator mechanism in response to the pitch angle measuring instrument.

4. The multi-degree-of-freedom robotic arm according to claim 1, wherein:
  each of the first roll mechanism and the second roll mechanism further comprises:
    a roll angle measuring instrument installed on the roll driving member, wherein the roll angle measuring instrument is configured to obtain a rotation angle of the roll driving member so that the control system controls and drives the operation of the body mechanism and the actuator mechanism in response to the roll angle measuring instrument;
  the pitch mechanism further comprises:
    a pitch angle measuring instrument installed on the pitch driving member, wherein the pitch angle measuring instrument is configured to obtain a rotation angle of the pitch driving member so that the control system controls and drives the operation of the body mechanism and the actuator mechanism in response to the pitch angle measuring instrument; and
  rotation angle measuring instruments are provided at the rotary assembly, the first pitch joint and the second pitch joint, and the rotation angle measuring instruments are configured to obtain rotation angles so that the control system controls and drives the operation of the body mechanism and the actuator mechanism in response to the rotation angle measuring instruments.

5. The multi-degree-of-freedom robotic arm according to claim 1, wherein the oil supply mechanism comprises:
  an oil tank configured to store hydraulic oil;
  a hydraulic pump configured to deliver the hydraulic oil from the oil tank to the electrohydraulic servo valve; and
  a check valve connected between the hydraulic pump and the electrohydraulic servo valve to prevent the hydraulic oil from flowing back to the oil tank.

6. The multi-degree-of-freedom robotic arm according to claim 5, wherein the oil return mechanism comprises:
  a back pressure valve connected between the electrohydraulic servo valve and the oil tank to control a working pressure of hydraulic oil flowing back to the oil tank; and
  an adjustable relief valve connected between the oil supply mechanism and the oil tank to control the working pressure of hydraulic oil flowing back to the oil tank.

7. The multi-degree-of-freedom robotic arm according to claim 6, wherein the hydraulic oil source further comprises two oil filters respectively connected between the hydraulic pump and the oil tank and between the oil return mechanism and the oil tank.

* * * * *